United States Patent
Huang

(10) Patent No.: US 9,485,435 B2
(45) Date of Patent: Nov. 1, 2016

(54) DEVICE FOR SYNTHESIZING HIGH DYNAMIC RANGE IMAGE BASED ON PER-PIXEL EXPOSURE MAPPING AND METHOD THEREOF

(71) Applicant: Shih-Chieh Huang, Taipei (TW)

(72) Inventor: Shih-Chieh Huang, Taipei (TW)

( * ) Notice: Subject to any disclaimer, the term of this patent is extended or adjusted under 35 U.S.C. 154(b) by 190 days.

(21) Appl. No.: 14/258,531

(22) Filed: Apr. 22, 2014

(65) Prior Publication Data

US 2015/0304538 A1 Oct. 22, 2015

(51) Int. Cl.
*H04N 5/235* (2006.01)
*G06T 5/50* (2006.01)
*G06T 5/00* (2006.01)

(52) U.S. Cl.
CPC ............. *H04N 5/2355* (2013.01); *G06T 5/009* (2013.01); *G06T 5/50* (2013.01); *G06T 2207/20208* (2013.01); *G06T 2207/20221* (2013.01)

(58) Field of Classification Search
CPC ....... G06T 5/50; G06T 5/009; H04N 5/2355; H04N 5/355; H04N 5/35536; H04N 5/35554; H04N 5/35563; H04N 5/23232
See application file for complete search history.

(56) References Cited

U.S. PATENT DOCUMENTS 5,828,793 A * 10/1998 Mann ............... G06T 5/007
348/222.1

OTHER PUBLICATIONS

Mir Adnan Ali and Steve Mann (2012), "Comparametric image compositing: Computationally efficient high dynamic range imaging", IEEE International Conference on Acoustics, Speech, and Signal Processing (ICASSP2012) Kyoto, Japan, pp. 913-916.*

Steve Mann, Raymond Chun Hing Lo, Kalin Ovtcharov, Shixiang Gu, David Dai, Calvin Ngan, Tao Ai (2012). "Realtime HDR (High Dynamic Range) Video for EyeTap Wearable Computers, FPGA-Based Seeing Aids, and GlassEyes", IEEE CCECE 2012, Montreal, Apr. 29-May 2, 2012. pp. 1-6.*

Huang, Jason et al., High Dynamic Range Tone Mapping Based on Per-Pixel Exposure Mapping, *IEEE International Symposium on Technology and Society (ISTAS)*, 2013, pp. 98-106.

* cited by examiner

*Primary Examiner* — Nelson D. Hernández Hernández
(74) *Attorney, Agent, or Firm* — Muncy, Geissler, Olds & Lowe, P.C.

(57) ABSTRACT

A device for synthesizing a high dynamic range image based on per-pixel exposure mapping includes an image-capturing module, an image-processing module, and a recursive control module. The image-capturing module serves to obtain a plurality of source images each having a unique exposure value. The image-processing module uses an exposure-value modulating means to perform exposure synthesis to pixels on an identical location of two of the source images that have similar exposure values according to exposure values of the pixels, so as to form synthesis images. The recursive control module sends the synthesis images back to the image-processing module for reprocessing until the image-processing module generates a single synthesis image.

14 Claims, 6 Drawing Sheets

DEVICE FOR SYNTHESIZING HIGH DYNAMIC RANGE IMAGE BASED ON PER-PIXEL EXPOSURE MAPPING AND METHOD THEREOF

BACKGROUND OF THE INVENTION

1. Technical Field

The present invention relates to a device for synthesizing a high dynamic range image and a method thereof. More particularly, the present invention relates to a device and a method for synthesizing a high dynamic range image based on per-pixel exposure mapping.

2. Description of Related Art

Due to hardware limitation, a photosensitive element is unavoidably has its dynamic imaging range limited. For a scene containing lighter and darker parts that are excessively different in terms of brightness, in the case of a low dynamic range, the captured image may have the lighter parts shown as an expanse of whiteness and the darker parts shown as an expanse of blackness, making the captured image lose image details (such as information about contours and lines) in the extremely light and dark areas and thus fail to faithfully reflect the real scene.

For addressing this problem, many approaches have been proposed in order to improve dynamic range imaging. The images generated through these imaging approaches are usually referred to as HDRI (High Dynamic Range Imaging). A commonly adopted high dynamic range imaging technology involves adjusting a photographic equipment's parameters so as to capture images of an identical scene with different exposure values, and then synthesizing the captured images. Such image synthesis helps to keep the details of both the light and dark areas in the resultant image, thereby faithfully reproducing the original scene and in turn expanding the displayable dynamic range. This technology is extensively usable for, such as, shooting in high-contrast environments or welding masks to perform real-time weld seam tracking. In the latter case, the high-contrast source images captured during welding operation are processed and synthesized to allow the operator to find locations of welds through the display screen.

While the forgoing imaging scheme works when the shot subject matter is in a static state, for a subject matter moves during the image-capturing process, offset may exist between the images of the subject matter in two successive frames (depending on the movement velocity and the number of frames obtained every second) and such offset may be regarded as noise during imaging, thus leading to image distortion.

Additionally, since all pixels in each image are synthesized using the same exposure value as the benchmark, during tone mapping, depending on the brightness (Quantigraphic Measure), camera response function and noise interference of each pixel, the pixels having too high or too low brightness may be presented in the resultant image as over-exposed or under-exposed areas and fail to present details clearly due to high contrast. As a result, even the image processed by the high dynamic range imaging fails to present all the details, meaning that the existing technology needs to be improved for perfect tone mapping.

BRIEF SUMMARY OF THE INVENTION

The objective of the present invention is to solve the problem about delay-related noise and loss of details in extremely light or dark areas in a synthesized high dynamic range image formed during tone mapping.

A aspect of the present invention is to provide a device for synthesizing a high dynamic range image based on per-pixel exposure mapping, comprising: an image-capturing module, for obtaining a plurality of source images each having a unique exposure value; an image-processing module, for performing an exposure-value modulating means to exposure values of pixels on an identical location in two said source images that have similar said exposure values so as to achieve exposure synthesis of the pixels and form synthesis images; and a recursive control module, for sending the formed synthesis images back to the image-processing module for reprocessing until the image-processing module generates only one said synthesis image.

Preferably, the exposure-value modulating means performs weighted sum method between the exposure values of the pixels on the identical location in the two source images having the similar exposure values according to the following equation:

$$EV_{i,j} = \frac{C_i EV_i + C_j EV_j}{C_i + C_j}$$

Preferably, the exposure synthesis involves applying the exposure value obtained from the weighted sum method performed by the exposure-value modulating means to the following equation, thereby generate a synthesis pixel:

$$p_{mapped} = f(\hat{k}\hat{q})$$

Preferably, the image synthesizing device further comprises an extension synthesizing module, which serves to generate a virtual pixel when an exposure-value difference between the pixels on the identical location in the two source images is greater than a threshold, to generate a first correcting pixel and a second correcting pixel according to exposure-value differences between the virtual pixel and the two pixels on the identical location in the two source images, and to generate the synthesis pixel according to an exposure-value difference between the first correcting pixel and the second correcting pixel.

Preferably, the virtual pixel has an exposure value that is an average of the exposure values of the two pixels on the identical location in the two source images.

Preferably, the image-processing module serves to generate a plurality of mapping functions according to the exposure-value modulating means, to generate a look-up table (LUT) according to the mapping functions, and to apply the exposure-value difference between the pixels on the identical location in the two source images to the look-up table, so as to generate the synthesis pixel.

Another aspect of the present invention is to provide a method for synthesizing a high dynamic range image based on per-pixel exposure mapping, the method comprising the following steps: (a) obtaining a plurality of source images each having a unique exposure value; (b) using an exposure-value modulating means to perform exposure synthesis to pixels on an identical location in two said source images that have similar said exposure values, so as to form synthesis images; and (c) where the formed synthesis images are plural, sending the synthesis images back to the step (b) for reprocessing.

Preferably, the exposure-value modulating means comprises the following steps: generating a synthesis exposure value by means of weighted sum method; and generating the synthesis image according to the synthesis exposure value.

Preferably, the exposure-value modulating means generates the synthesis pixel using the following equation:

$$p_{mapped} = f(\hat{k}\hat{q})$$

Preferably, the weighted sum method comprises the following steps: among the pixels on the identical location, measuring e a first exposure value and a first weight coefficient of the pixel of the image having the lower exposure value; among the pixels on the identical location, measuring a second exposure value and second weight coefficient of the pixel of the image having the higher exposure value; and summing up a product of multiplying the first exposure value by the first weight coefficient and a product of multiplying the second exposure value by the second weight coefficient to get a sum, and dividing the sum by a sum of the first weight coefficient and the second weight coefficient, so as to generate the synthesis exposure value, which is written as the following equation:

$$EV_{i,j} = \frac{C_i EV_i + C_j EV_j}{C_i + C_j}$$

Preferably, the first weight coefficient and the second weight coefficient are inverse functions of Shannon's entropies of brightness dynamic ranges of the pixels on the identical location in the two source images, and is written as the following equation:

$$C_{Y_i|\zeta} = H^N(Y_i|\zeta)^{-1}$$

Preferably, the weighted sum method further comprises the following steps: where the exposure-value difference between the pixels on the identical location of the two source images is greater than a threshold, generating a virtual pixel that has an exposure value being between the exposure values of the pixels on the identical location of the two source images; and among the pixels on the identical location, performing the weighted sum method to the virtual pixel and the pixel having the lower exposure value in the two source images, so as to generate a first correcting pixel, and performing the weighted sum method to the virtual pixel and the pixel having the greater exposure value in the two source images, so as to generate a second correcting pixel; and replacing the pixel of the image having the lower exposure value with the first correcting pixel, replacing the pixel of the image having the higher exposure value with the second correcting pixel, and performing the weighted sum method.

Preferably, the exposure value of the virtual pixel is an average of the exposure values of the pixels on the identical location of the two images.

Preferably, the pixel synthesis further comprises the following steps: generating a mapping function for each of the exposure-value differences, and generating a look-up table (LUT) according to the mapping functions; and applying the exposure-value difference between the pixels on the identical location in the two source images to the look-up table, so as to generate the synthesis pixel.

Therefore, the present invention provides schemes that are superior to the prior art by having the following beneficial effects.

1. The disclosed device and method for synthesizing a high dynamic range image based on per-pixel exposure mapping synthesize each pixel in the image independently, thereby be able to present details in even the lightest and darkest areas without loss.

2. When the exposure-value difference between pixels of two processed images is excessively high, the extension synthesizing module of the present invention serves to generate a virtual pixel with an exposure value in the middle of the two exposure values, and synthesize the virtual pixel and the two images, so as to minimize the problems about blocky effect caused by the high exposure-value difference and about the synthesis pixel going beyond the critical point of the dynamic range.

3. The present invention further provides a scheme to generate a look-up table for enhancing the efficiency of the overall algorithm according to the present invention, and the scheme is applicable to high dynamic range imaging of movements such as welding operation with ensured temporal continuity.

BRIEF DESCRIPTION OF THE SEVERAL VIEWS OF THE DRAWINGS

FIG. 3-1 and FIG. 3-2 are graphs showing output of the image synthesis according to the present invention.

DETAILED DESCRIPTION OF THE INVENTION

The structural features and operations of the present invention will be described below by reference to the accompanying drawings.

Figure 1:
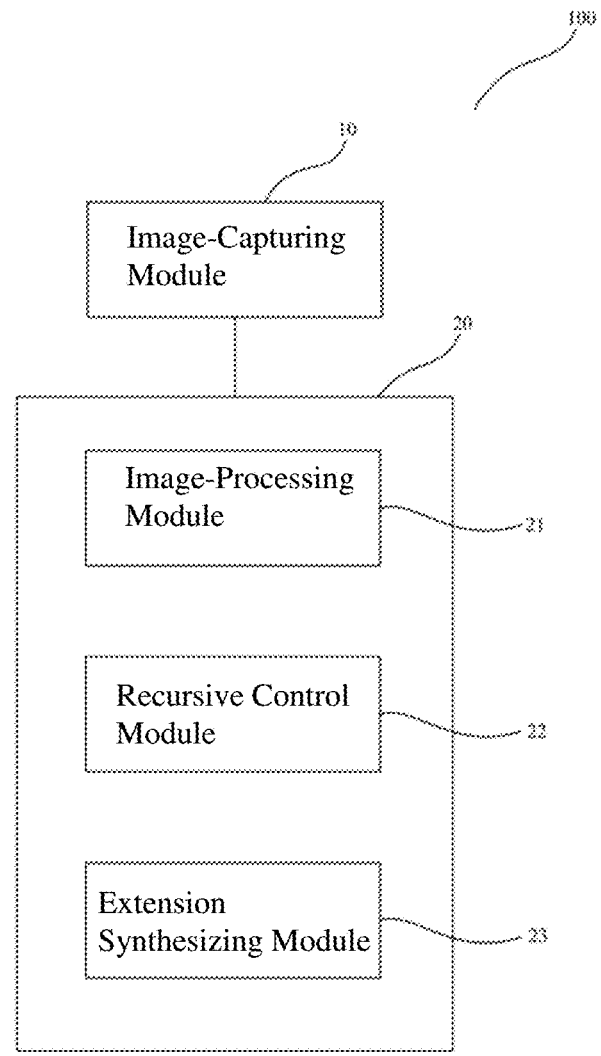
FIG. 1 is a block diagram of a device for synthesizing a high dynamic range image based on per-pixel exposure mapping according to the present invention.

Please refer to FIG. 1 for the technical feature of the present invention. A device for synthesizing a high dynamic range image based on per-pixel exposure mapping is illustrated in the block diagram. As shown, the image-synthesizing device 100 comprises: an image-capturing module 10 and a processing unit 20. The image-capturing module 10 is one selected from the group consisting of a camera lens, a video camera lens, and a scanner lens, for capturing images of scenes and objects. The image-capturing module 10 captures images of an identical scene or object with different exposure values, thereby obtaining a plurality of images each having a unique exposure value. The processing unit 20 comprises an image-processing module 21 and a recursive control module 22. The processing unit 20 may be an image processing unit in an imaging device (such as a camera, a video camera, or a scanner), or a program installed in a field programmable gate array (FPGA) chip in the imaging device. When applied to a desktop computer, a laptop computer or a mobile device, the processing unit 20 may be an arithmetic unit in such a device, while the image-processing module 21 and the recursive control module 22 may be graphics software or a program in image processing software, for which the present invention provides no limitation.

As used in the present invention, the term "per-pixel exposure mapping" has the following definition. For synthesizing a high dynamic range image, each source image has N pixels. Each pair of source images to be synthesized have corresponding pixel at the same location. For the sake of convenient description, the pixels at the same location in two source images are collectively referred to as a pixel pair. Instead of using the same exposure value for synthesis of all pixels in an image as performed by the prior art, the present invention synthesizes a high dynamic range image according to the exposure-value difference of each pixel pair of the source images using the weighted sum method. The resultant pixel after per-pixel exposure mapping is generated according to the following Equation (1):

In Equation (1), $\hat{q}$ and $\hat{k}$ both correspond to a coordinate along the horizontal and vertical axes of the image, namely the coordinates of the pixel in the image. For the simplified expression of the equation, the coordinates of $\hat{q}$ and $\hat{k}$ are herein omitted. Therein, $P_{mapped}$ is the post-mapping pixel value; $f$ represents the camera response function of the image-capturing device; $\hat{q}$ represents the estimated brightness value obtained by dividing the $p_{mapped}=f(\hat{k}\hat{q})$ inverse function of the pixel's camera response function with the given exposure level; and $\hat{k}$ is an estimated exposure level the pixel obtained by dividing the inverse function of the pixel value's camera response function with the incident light amount of the image. The relation between the exposure level $\hat{k}$ and the pixel's exposure value EV is $\hat{k}=2^{EV}$. The primary objective of the present invention is to synthesize the exposure values EV of each pixel pair from the two source images, so as to obtain the more appropriate exposure level $\hat{k}$.

The image processing procedure performed in the present invention will be given below in detail.

Figure 2:
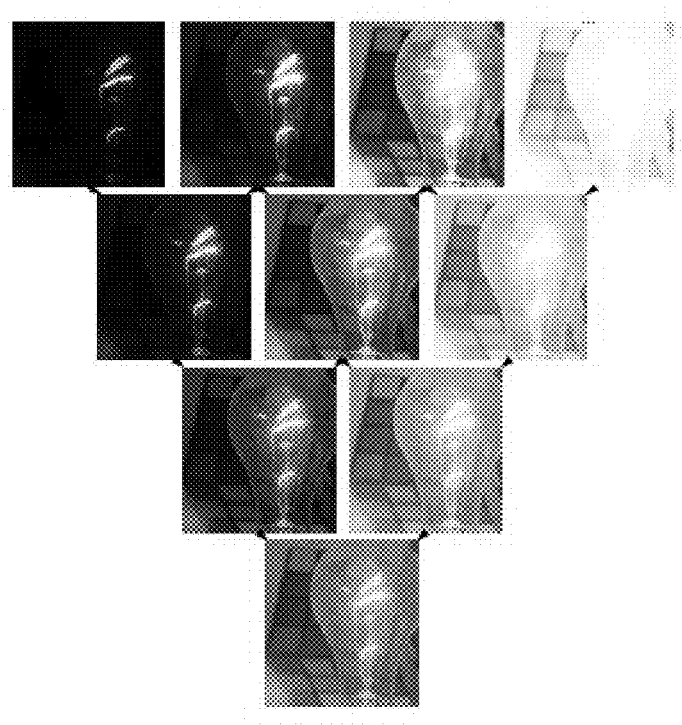
FIG. 2 is a figure illustrating image synthesis according to the present invention.

For better understanding image synthesis of the present invention, please refer to FIG. 2, which is a figure illustrating image synthesis according to the present invention. As shown, the image-processing module 21 synthesizes each two of sources images that have similar exposure values. Where the total amount of the source images is I, the image-processing module 21 generates (I-1) synthesis images after synthesis, and the recursive control module 22 sends the generated synthesis images back to the image-processing module 21 for reprocessing. After I-1 recursions, a last synthesis image will be remained as the high dynamic range image that keeps all image details after dynamic range compression.

More particularly, from the plural source images acquired by the image-capturing module 10, the image-processing module 21 selects two that have similar exposure values. For the sake of convenient description, the two selected images are referred to as image i and image j, wherein the overall exposure value of the image i is smaller than that of the image j. The $N^{th}$ pixel in the image i is referred to as the pixel $P_{Ni}$, and the $N^{th}$ pixel in the image j is referred to as the pixel $P_{Nj}$. The pixel $P_{Ni}$ and the pixel $P_{Nj}$ form a pixel pair of an identical location. Following the foregoing step, the image-processing module 21 calculates an exposure-value difference $\Delta EV_{i,j}$ between the pixel $P_{Ni}$ and the pixel $P_{Nj}$, and performs weighted sum method according to the exposure-value difference $\Delta EV_{i,j}$ and the exposure values of the pixel $P_{Ni}$ and pixel $P_{Nj}$, so as to generate a synthesis exposure value $EV_{i,j}$. Afterward, by applying the synthesis exposure value $EV_{i,j}$ to the foregoing Equation (1), the post-mapping synthesis pixel is obtained. After synthesizing N pixel pairs, the image-processing module 21 generates N synthesis pixels, of which the desired high dynamic range image is composed.

As used in the present invention, the term "Weighted Sum Method" means assigning the exposure values of two pixels ($P_{Ni}$ and $P_{Nj}$) according to a certain weight, and can be determined by the following Equation (2):

$$EV_{i,j} = \frac{C_i EV_i + C_j EV_j}{C_i + C_j}$$

In Equation (2), $EV_{i,j}$ is the assigned exposure value; $EV_i$ and $EV_j$ represent the exposure values of the two pixels, respectively; and $C_i$ and $C_j$ are two weight coefficients for the two pixels. The generated exposure value $EV_{i,j}$ is closer to the exposure value of the pixel having the greater weight coefficient.

However, the weight coefficients $C_i$ and $C_j$ are also subject to the variation range of the pixels' brightness. Due to the effect of noise, during the mapping process of the pixel $P_{Ni}$ and the pixel $P_{Nj}$, one pixel value may divergently generate plural pixel values, bringing about mapping uncertainty. For addressing this problem, the present invention considers the dynamic range of the pixels' brightness. In particular, in the present invention, the maximum of the brightness is divided by the minimum of the brightness, and the logarithm of the quotient is used to find out the uncertainty equation of the dynamic range of the image through using Shannon's entropy model as referred in many information theories. The equation is selected from the sample space generated by the vectors composed of the pixels' exposure levels and the exposure-value differences between the image pixels each having a unique exposure value. In the case the camera response function of the image-capturing device is simplified, the certainty functions of each of the two images can be obtained using the inverse function of the Shannon's entropy, as Equation (3), where pixel $P_{Ni}$ is taken as an example:

$$C_{Y_i|\zeta} = H^N(Y_i|\zeta)^{-1}$$

Where C is the weight coefficient; and $Y_i$ is the value obtained by dividing the inverse function of the camera response function of pixel $P_{Ni}$ with its brightness and exposure level. Mathematically, $Y_i$ is the ratio between the estimated exposure level $\hat{k}_i$ obtained using the inverse method based on the camera response function and the actual exposure level of the pixel, and can be written as:

$$Y_i = \frac{f^{-1}(p_i)}{k_i q} = \frac{\hat{k}_i}{k_i}$$

$H^N$ is the entropy of the normal distribution of $Y_i$ in the sample space of the vector $\zeta$ (defined as [brightness q, exposure-value difference $\Delta EV_{i,j}$]). By applying the pixel values of the two pixels to be synthesized to the certainty functions, the weight coefficients of the pixels for weighted sum method are obtained. Then the exposure value facilitating detail display is synthesized according to the weight coefficient. For instance, in a relatively dark area, the weight coefficient of a pixel having the smaller exposure value is greater than that of a pixel having the greater exposure value. When the exposure-value difference between two pixels is greater, the difference between their weight coefficients is greater. However, the above-mentioned approach is for illustration only. According to the camera response function, other certainty equations may be derived using other mathematic models. The present invention is intended to discuss the case where the camera response function is a logarithmic function, but not to limit its algorithmic method.

Figures 1, 3:
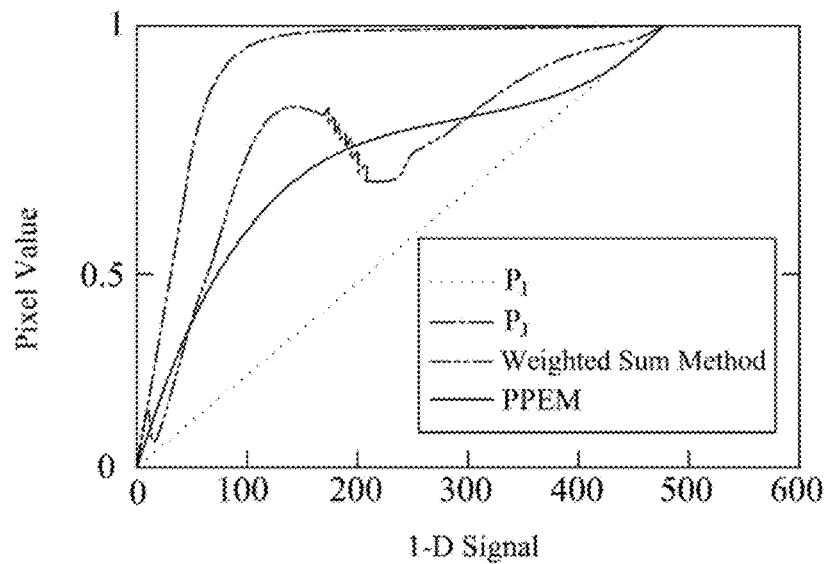
Figures 2, 3:
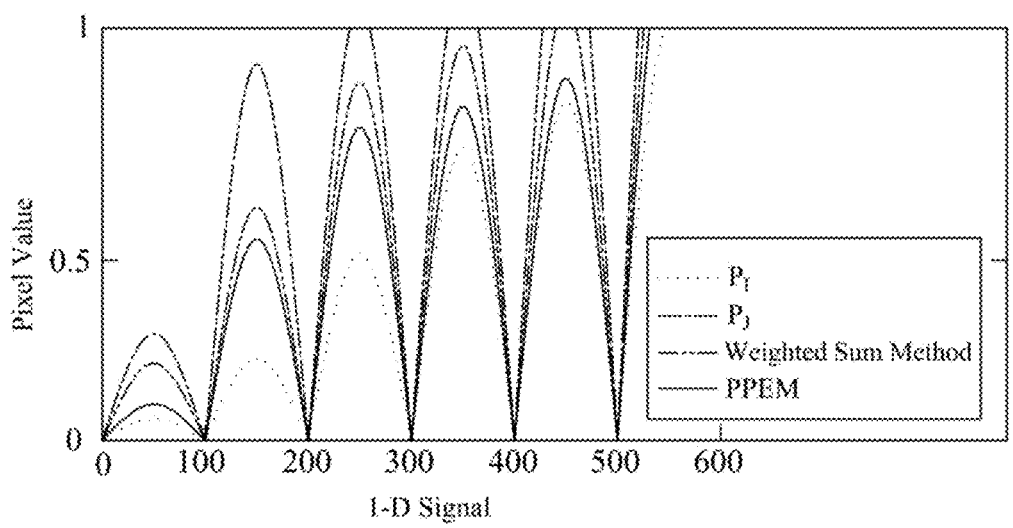

According to the above, when the exposure-value difference between the $N^{th}$ pixel pair of the two source images is excessively high, a large difference exists between the weight coefficients of the pixels, and this may make the generated high dynamic range image fail to display all image details. Please also refer to FIG. 3-1 and FIG. 3-2. The drawings are graphs showing output of the image synthesis according to the present invention. As shown, FIG. 3-1 and FIG. 3-2 each represent a single-dimensional image. The horizontal axis denotes the 600 pixels in the image, and the vertical axis is for representing the pixel values of the pixels. As shown in FIG. 3-1, in the case where the exposure-value difference is excessively high, pixel synthesis based on merely weighted sum method may cause discontinuity of the pixel values, making the synthesis image blocky. As demonstrated by the pixels in the last two curved sections of FIG. 3-2, the synthesis pixel synthesized from the darker pixel $P_i$ and the super light pixel $P_j$ can nevertheless go beyond the limit of the displayable dynamic range.

To solve the above-mentioned problem, the disclosed device 100 for synthesizing a high dynamic range image based on per-pixel exposure mapping further comprises an extension synthesizing module 23. When the exposure-value difference between $N^{th}$ pixels (pixel $P_{Ni}$ and pixel $P_{Nj}$) in the two source images is greater than a threshold, the extension synthesizing module 23 generates a virtual pixel and performs weighted sum method between the pixel $P_{Ni}$ and the virtual pixel, and between the pixel $P_{Nj}$ and the virtual pixel, respectively, so as to obtain a first correcting pixel and a second correcting pixel. At this time, if the exposure-value difference between the first and second correcting pixels has been reduced to be within a reasonable range, the synthesis pixel is generated according to the exposure-value difference immediately. On the other hand, if the exposure-value difference between the first and second correcting pixels remains too high, the extension synthesizing module 23 generates a virtual pixel again and repeats the above-mentioned steps until the exposure-value difference comes into the reasonable range. The threshold is not limited to a particular number and may be determined by the user according to the desired detail-displaying result of the high dynamic range image. By lowering the threshold, the synthesis image having clear details can be obtained. However, if the threshold is set excessively low, the synthesis image may contrarily become blurred. Hence, the threshold should be set within a reasonable range according to the practical needs. In a preferred embodiment, the exposure value of the virtual pixel is preferably the average of the exposure values of the $N^{th}$ pixels in the two source images, so that the generated correcting pixel can maximally reduce the exposure-value difference. The image processed by this procedure is equal to the extension of the foregoing weighted sum method. As shown in FIG. 3-1, the synthesis pixels processed by the extension synthesizing module 23 have their pixel values more continuous, meaning that the synthesis image has its edges smoother and less blocky. According to FIG. 3-2, the pixels as products of the extension synthesizing module 23 are all retained in the dynamic range, without loss of details caused by the excessively high exposure-value difference.

Figure 4:
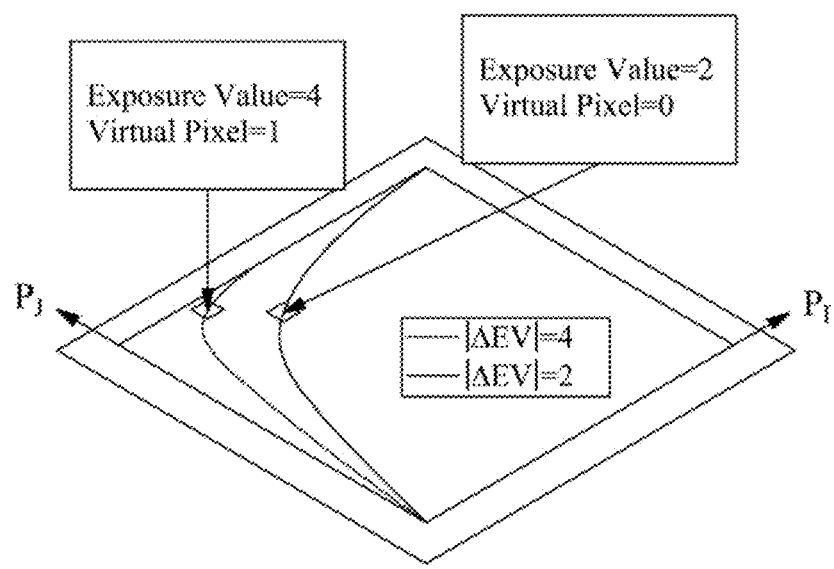
FIG. 4 is a schematic drawing showing the use of a look-up table according to the present invention.

In the case that the above-described imaging based on weighted sum method is performed as algorithm, and that the number of the images captured by the image-capturing module obtain is I, the time complexity of the algorithm is $O(I^2)$, meaning that when more images are obtained, the longer time is required for processing. On the other hand, where the exposure-value difference is excessively high so the extension synthesizing module has to generate V virtual pixels, the overall time complexity of the algorithm is further degraded to $O((VI)^2)$. When the subject to be processed is a dynamic scene (such as the welding operation mentioned previously), the frames per second (FPS) would be too few to allow the image to be displayed smoothly. In view of this, the present invention further provides a scheme to seep up the entire algorithm. The image-processing module 21 generates a mapping function for each of the exposure-value differences, and generates a look-up table (LUT) according to the mapping functions. Then the image-processing module 21 applies the exposure-value difference between the $N^{th}$ pixels of the two source images to the look-up table, so as to generate the synthesis pixel. Referring to FIG. 4, this figure illustrates the look-up table of the present invention. Particularly, the look-up table is generated through the following steps. During each weighted sum method of pixel pairs, the pixel pair having the greater exposure-value difference is inserted with a virtual pixel by the extension synthesizing module 23 prior to synthesis, and the mapping results of all the exposure-value differences are summarized as a mapping function, after which all the mapping functions are combined in the same plane to form the look-up table as shown in FIG. 4. In practical use, the processing unit can simply generate the synthesis pixel by applying the pixel values and exposure-value difference of each pixel pair in the image to the look-up table. Thereby, ideally, the time complexity of the algorithm can be optimized to $O(1)$, in turn reducing the time required by synthesis of the desired high dynamic range image. As the method of summarizing the mapping function is known in the art, the related description is omitted herein.

Figure 5:
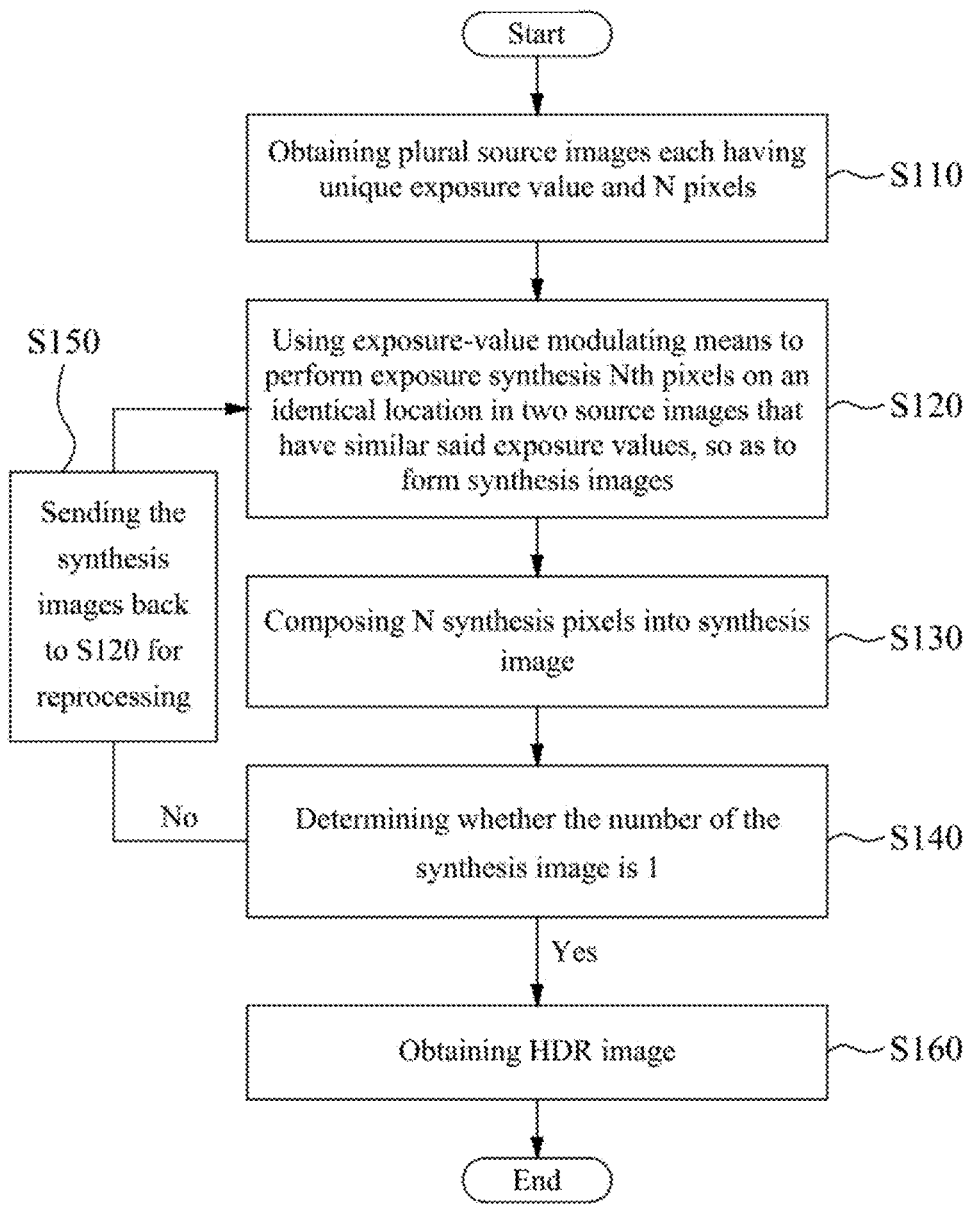
FIG. 5 through FIG. 6 are flowcharts of the present invention.
Figure 6:
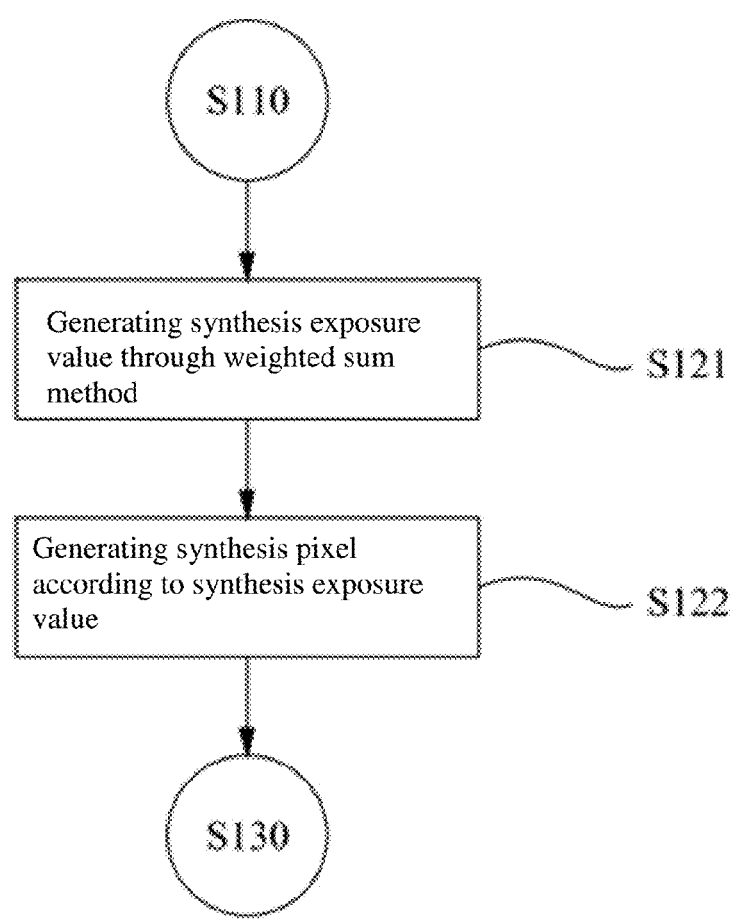

The following sections will then be directed to a method of the present invention for synthesizing a high dynamic range image based on per-pixel exposure mapping range imaging. Please refer to FIG. 5 and FIG. 6, which are flowcharts of the disclosed method. As shown, the method includes the following steps. In a first step, plural source images each having a unique exposure value are obtained, wherein each of the images contains N pixels (S110). As a second step, an exposure-value modulating means is used to perform exposure synthesis to the $N^{th}$ pixels on an identical location in two said source images that have similar said exposure values, so as to form synthesis images (S120). Therein, the exposure-value modulating means includes the following steps: generating a synthesis exposure value by means of weighted sum method (S121), and generating a synthesis pixel according to the synthesis exposure value (S122). Afterward, the N synthesis pixels are used to form a synthesis image (S130). At last, where the number of the synthesis image is not 1, the synthesis images are sent back to the step S120 for reprocessing (S140). Through the above-described method, the present invention is capable of synthesizing each pixel pair associated to the same location in plural source images. At last, a high dynamic range image as desired can be obtained.

The process of pixel synthesis as performed in the present invention will be described in detail below. For weighted sum method, among the pixels on the identical location, a first exposure value and a first weight coefficient are measured from the source image having the lower exposure value. Then a second exposure value and a second weight coefficient are measured from the source image having the greater exposure value. The first exposure value is multiplied by the first weight coefficient and the second exposure value is multiplied by the second weight coefficient. At last, the sum of their products is then divided by a sum of the first weight coefficient and the second weight coefficient, so as to generate the synthesis exposure value, based on which a synthesis pixel is generated. Therein the first weight coefficient and the second weight coefficient are the inverse functions of the Shannon's entropies of the brightness dynamic ranges of the $N^{th}$ pixels in the two images.

For avoiding image discontinuity and loss of details caused by an excessively high exposure-value difference, the above-described weighted sum method further includes the following steps. Where the exposure-value difference between the $N^{th}$ pixels of the two source images is greater than a threshold, a virtual pixel having an exposure value between the exposure values of the $N^{th}$ pixels of the two source images is generated. In a preferred embodiment, the virtual pixel's exposure value is the average of the exposure values of the $N^{th}$ pixels in the two image. Afterward, weighted sum method is performed to the virtual pixel and the $N^{th}$ pixel in the image having the lower exposure value, so as to generate a first correcting pixel. Then assignment is performed to the virtual pixel and the $N^{th}$ pixel in the image having the higher exposure value, so as to generate a second correcting pixel. At last, the first correcting pixel is used to replace the $N^{th}$ pixel of the image having the lower exposure value, and the second correcting pixel used to replace the $N^{th}$ pixel of the image having the greater exposure value, and weighted sum method is performed again.

At last, for improving the algorithmic efficiency of the disclosed method, the following steps are performed during pixel synthesis. First, a mapping function is generated for each of the exposure-value differences. Then a look-up table (LUT) is generated according to the mapping functions. Afterward, the exposure-value difference between the $N^{th}$ pixels in the two source images is applied to the look-up table, so as to generate the synthesis pixel.

To sum up, the disclosed device for synthesizing a high dynamic range image based on per-pixel exposure mapping and its operating method uses the image-capturing module to obtain a plurality of images each having a unique exposure value, and then uses the image-processing module to synthesize synthesis images showing more details, which are processed by the recursive control module to generate a desired high dynamic range image. In addition, when the exposure-value difference between the pixels of two source images is excessively high, a virtual pixel may be inserted by the extension synthesizing module, so as to prevent resultant image from discontinuity or loss of details. The disclosed method speeds up the algorithm by building a look-up table, so the disclosed device for synthesizing a high dynamic range image based on per-pixel exposure mapping and its operating method is enabled to process continuously moving scenes into high dynamic range images with intact temporal continuity.

What is claimed is:

1. A device for synthesizing a high dynamic range image based on per-pixel exposure mapping, comprising:
    an image-capturing module, for obtaining a plurality of source images each having a unique exposure value;
    an image-processing module, for performing an exposure-value modulating means to exposure values of pixels on an identical location in two said source images that have similar said exposure values so as to achieve exposure synthesis of the pixels and form synthesis images; and
    a recursive control module, for sending the formed synthesis images back to the image-processing module for reprocessing until the image-processing module generates only one said synthesis image.

2. The image synthesizing device of claim 1, wherein the exposure-value modulating means performs weighted sum method between the exposure values of the pixels on the identical location in the two source images having the similar exposure values according to the following equation:

$$EV_{i,j} = \frac{C_i EV_i + C_j EV_j}{C_i + C_j}.$$

3. The image synthesizing device of claim 1, wherein the exposure synthesis involves applying the exposure value obtained from the weighted sum method performed by the exposure-value modulating means to the following equation, thereby generate a synthesis pixel:

$$p_{mapped} = f(\hat{k}\hat{q}).$$

4. The image synthesizing device of claim 3, further comprising an extension synthesizing module, which serves to generate a virtual pixel when an exposure-value difference between the pixels on the identical location in the two source images is greater than a threshold, to generate a first correcting pixel and a second correcting pixel according to exposure-value differences between the virtual pixel and the two pixels on the identical location in the two source images, and to generate the synthesis pixel according to an exposure-value difference between the first correcting pixel and the second correcting pixel.

5. The image synthesizing device of claim 4, wherein the virtual pixel has an exposure value that is an average of the exposure values of the two pixels on the identical location in the two source images.

6. The image synthesizing device of claim 1, wherein the image-processing module serves to generate a plurality of mapping functions according to the exposure-value modulating means, to generate a look-up table (LUT) according to the mapping functions, and to apply the exposure-value difference between the pixels on the identical location in the two source images to the look-up table, so as to generate the synthesis pixel.

7. A method for synthesizing a high dynamic range image based on per-pixel exposure mapping, the method comprising the following steps:
    (a) obtaining a plurality of source images each having a unique exposure value;
    (b) using an exposure-value modulating means to perform exposure synthesis to pixels on an identical location in two said source images that have similar said exposure values, so as to form synthesis images; and
    (c) where the formed synthesis images are plural, sending the synthesis images back to the step (b) for reprocessing.

8. The method of claim 7, wherein the exposure-value modulating means comprises the following steps:
    generating a synthesis exposure value by means of weighted sum method; and
    generating the synthesis image according to the synthesis exposure value.

9. The method of claim 8, wherein the exposure-value modulating means generates the synthesis pixel using the following equation:

$$p_{mapped} = f(\hat{k}\hat{q}).$$

10. The method of claim 8, wherein the weighted sum method comprises the following steps:

among the pixels on the identical location, measuring e a first exposure value and a first weight coefficient of the pixel of the image having the lower exposure value;

among the pixels on the identical location, measuring a second exposure value and second weight coefficient of the pixel of the image having the higher exposure value; and summing up a product of multiplying the first exposure value by the first weight coefficient and a product of multiplying the second exposure value by the second weight coefficient to get a sum, and dividing the sum by a sum of the first weight coefficient and the second weight coefficient, so as to generate the synthesis exposure value, which is written as the following equation:

$$EV_{i,j} = \frac{C_i EV_i + C_j EV_j}{C_i + C_j}.$$

11. The method of claim 10, wherein the first weight coefficient and the second weight coefficient are inverse functions of Shannon's entropies of brightness dynamic ranges of the pixels on the identical location in the two source images, and is written as the following equation:

$$C_{Y_i|\zeta} = H^N(Y_i|\zeta)^{-1}.$$

12. The method of claim 10, wherein the weighted sum method further comprises the following steps:

where the exposure-value difference between the pixels on the identical location of the two source images is greater than a threshold, generating a virtual pixel that has an exposure value being between the exposure values of the pixels on the identical location of the two source images; and among the pixels on the identical location, performing the weighted sum method to the virtual pixel and the pixel having the lower exposure value in the two source images, so as to generate a first correcting pixel, and performing the weighted sum method to the virtual pixel and the pixel having the greater exposure value in the two source images, so as to generate a second correcting pixel; and replacing the pixel of the image having the lower exposure value with the first correcting pixel, replacing the pixel of the image having the higher exposure value with the second correcting pixel, and performing the weighted sum method.

13. The method of claim 12, wherein the exposure value of the virtual pixel is an average of the exposure values of the pixels on the identical location of the two images.

14. The method of claim 7, wherein the pixel synthesis further comprises the following steps:

generating a mapping function for each of the exposure-value differences, and generating a look-up table (LUT) according to the mapping functions; and applying the exposure-value difference between the pixels on the identical location in the two source images to the look-up table, so as to generate the synthesis pixel.

* * * * *